US012591993B2

(12) United States Patent
Sakai

(10) Patent No.: US 12,591,993 B2
(45) Date of Patent: Mar. 31, 2026

(54) INFORMATION GENERATION APPARATUS, INFORMATION GENERATION METHOD, AND STORAGE MEDIUM

(71) Applicant: CANON KABUSHIKI KAISHA, Tokyo (JP)

(72) Inventor: Tomohiro Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 18/327,739

(22) Filed: Jun. 1, 2023

(65) Prior Publication Data

US 2023/0394700 A1 Dec. 7, 2023

(30) Foreign Application Priority Data

Jun. 7, 2022 (JP) ................................. 2022-092383

(51) Int. Cl.
*G06T 7/70* (2017.01)
*G06V 10/74* (2022.01)

(52) U.S. Cl.
CPC .............. *G06T 7/70* (2017.01); *G06V 10/761* (2022.01); *G06T 2207/30242* (2013.01); *G06V 2201/07* (2022.01)

(58) Field of Classification Search
CPC .... G06T 7/70; G06T 7/20; G06T 7/60; G06T 2207/30242; G06V 10/74; G06V 40/00; G06V 20/00; G06V 20/60; G06V 10/761; G06V 2201/07; G06V 2201/10

USPC .......................................................... 382/103
See application file for complete search history.

(56) References Cited

U.S. PATENT DOCUMENTS

| | | | |
|---|---|---|---|
| 2018/0218515 A1* | 8/2018 | Terekhov ............... | G06V 20/40 |
| 2022/0109838 A1* | 4/2022 | Guruva Reddiar ..... | G06T 7/194 |
| 2023/0217033 A1* | 7/2023 | Guruva ................ | H04N 19/186 |
| | | | 375/240.02 |

FOREIGN PATENT DOCUMENTS

JP 2019212963 A 12/2019

* cited by examiner

*Primary Examiner* — Duy M Dang

(74) *Attorney, Agent, or Firm* — Canon U.S.A., Inc. IP Division

(57) ABSTRACT

An information generation apparatus includes a determination unit configured to determine, based on a predetermined condition, whether to enable a grouping process for grouping objects detected from an image, and a generation unit configured to generate metadata regarding the objects detected from the image, wherein, in a case where the determination unit determines that the grouping process is to be enabled, the determination unit determines a plurality of objects as grouping targets according to positional relationships between the objects detected from the image, and wherein the generation unit generates metadata including information regarding an integrated object obtained by integrating the plurality of objects determined as the grouping targets.

10 Claims, 11 Drawing Sheets

FIG.2

| FIG.2A |
| FIG.2B |

FIG.2A    *200*

| annotated_regions( payloadSize ) { | |
| ar_cancel_flag | u(1) |
| if(!ar_cancel_flag) { | |
| ar_not_optimized_for_viewing_flag | u(1) |
| ar_true_motion_flag | u(1) |
| ar_occluded_object_flag | u(1) |
| ar_partial_object_flag_present_flag | u(1) |
| ar_object_label_present_flag | u(1) |
| ar_object_confidence_info_present_flag | u(1) |
| if( ar_object_confidence_info_present_flag ) | |
| ar_object_confidence_length_minus1 | u(4) |
| if( ar_object_label_present_flag ) { | |
| ar_object_label_language_present_flag | u(1) |
| if( ar_object_label_language_present_flag ) { | |
| while( !byte_aligned( ) ) | |
| ar_bit_equal_to_zero /* equal to 0 */ | f(1) |
| ar_object_label_language | st(v) |
| } | |
| ar_num_label_updates | ue(v) |
| for( i = 0; i < ar_num_label_updates; i++ ) { | |
| ar_label_idx[ i ] | ue(v) |
| ar_label_cancel_flag | u(1) |
| LabelAssigned[ ar_label_idx[ i ] ] = !ar_label_cancel_flag | |
| if( !ar_label_cancel_flag ) { | |
| while( !byte_aligned( ) ) | |
| ar_bit_equal_to_zero /* equal to 0 */ | f(1) |
| ar_label[ ar_label_idx[ i ] ] | st(v) |
| } | |
| } | |
| } | |

FIG.2B

| | |
|---|---|
| ar_num_object_updates | ue(v) |
| for( i = 0; i < ar_num_object_updates; i++ ) { | |
|    ar_object_idx[ i ] | ue(v) |
|    ar_object_cancel_flag | u(1) |
|    ObjectTracked[ ar_object_idx[ i ] ] = !ar_object_cancel_flag | |
|    if( !ar_object_cancel_flag ) { | |
|       if( ar_object_label_present_flag ) { | |
|          ar_object_label_update_flag | u(1) |
|          if( ar_object_label_update_flag ) | |
|             ar_object_label_idx[ ar_object_idx[ i ] ] | ue(v) |
|       } | |
|       ar_bounding_box_update_flag | u(1) |
|       if( ar_bounding_box_update_flag ) { | |
|          ar_bounding_box_cancel_flag | u(1) |
|          ObjectBoundingBoxAvail[ ar_object_idx[ i ] ] = !ar_bounding_box_cancel_flag | |
|          if( !ar_bounding_box_cancel_flag ) { | |
|             ar_bounding_box_top[ ar_object_idx[ i ] ] | u(16) |
|             ar_bounding_box_left[ ar_object_idx[ i ] ] | u(16) |
|             ar_bounding_box_width[ ar_object_idx[ i ] ] | u(16) |
|             ar_bounding_box_height[ ar_object_idx[ i ] ] | u(16) |
|             if( ar_partial_object_flag_present_flag ) | |
|                ar_partial_object_flag[ ar_object_idx[ i ] ] | u(1) |
|             if( ar_object_confidence_info_present_flag ) | |
|                ar_object_confidence[ ar_object_idx[ i ] ] | u(v) |
|          } | |
|       } | |
|    } | |
|    } | |
| } | |

Figure 3:
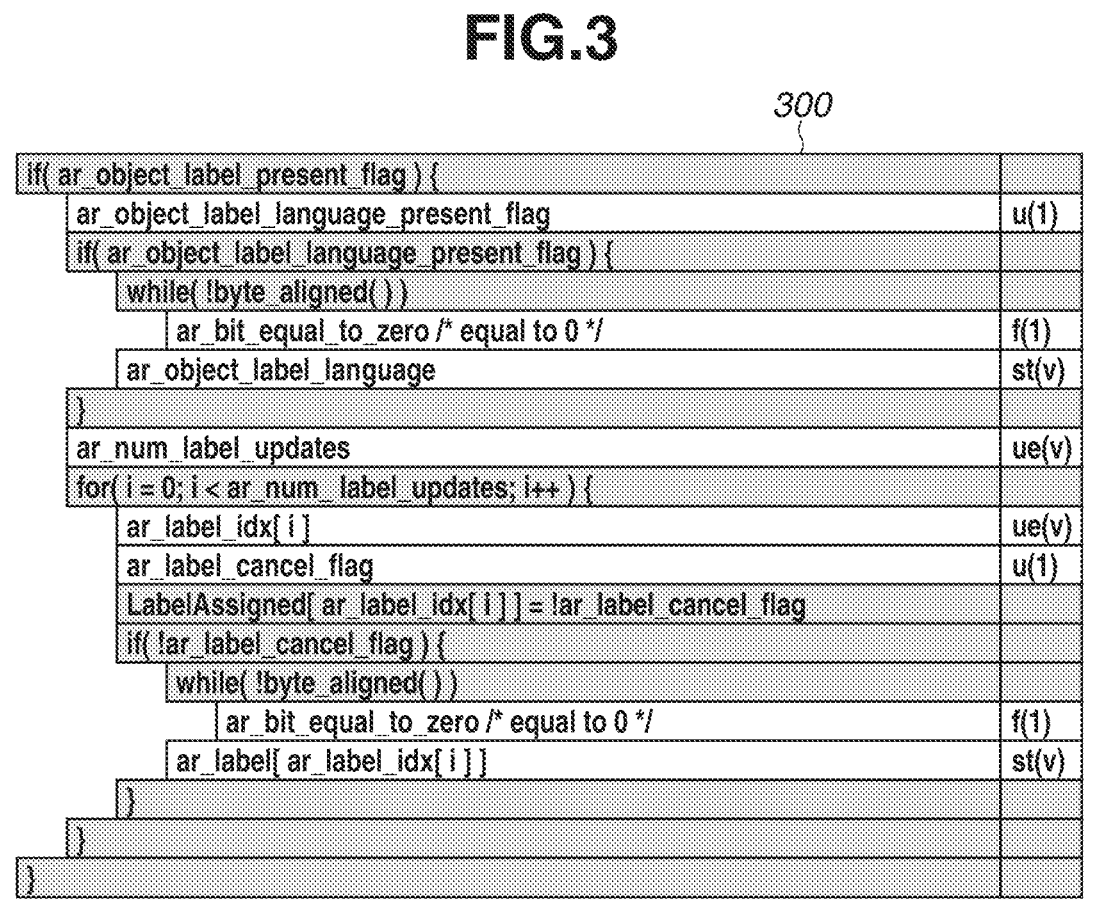

| | |
|---|---|
| if( ar_object_label_present_flag ) { | |
|  ar_object_label_language_present_flag | u(1) |
|  if( ar_object_label_language_present_flag ) { | |
|   while( !byte_aligned( ) ) | |
|    ar_bit_equal_to_zero /* equal to 0 */ | f(1) |
|   ar_object_label_language | st(v) |
|  } | |
|  ar_num_label_updates | ue(v) |
|  for( i = 0; i < ar_num_label_updates; i++ ) { | |
|   ar_label_idx[ i ] | ue(v) |
|   ar_label_cancel_flag | u(1) |
|   LabelAssigned[ ar_label_idx[ i ] ] = !ar_label_cancel_flag | |
|   if( !ar_label_cancel_flag ) { | |
|    while( !byte_aligned( ) ) | |
|     ar_bit_equal_to_zero /* equal to 0 */ | f(1) |
|    ar_label[ ar_label_idx[ i ] ] | st(v) |
|   } | |
|  } | |
| } | |

| | |
|---|---|
| ar_num_object_updates | ue(v) |
| for( i = 0; i < ar_num_object_updates; i++ ) { | |
|     ar_object_idx[ i ] | ue(v) |
|     ar_object_cancel_flag | u(1) |
|     ObjectTracked[ ar_object_idx[ i ] ] = !ar_object_cancel_flag | |
|     if( !ar_object_cancel_flag ) { | |
|         if( ar_object_label_present_flag ) { | |
|             ar_object_label_update_flag | u(1) |
|             if( ar_object_label_update_flag ) | |
|                 ar_object_label_idx[ ar_object_idx[ i ] ] | ue(v) |
|         } | |
|         ar_bounding_box_update_flag | u(1) |
|         if( ar_bounding_box_update_flag ) { | |
|             ar_bounding_box_cancel_flag | u(1) |
|             ObjectBoundingBoxAvail[ ar_object_idx[ i ] ] = !ar_bounding_box_cancel_flag | |
|             if( !ar_bounding_box_cancel_flag ) { | |
|                 ar_bounding_box_top[ ar_object_idx[ i ] ] | u(16) |
|                 ar_bounding_box_left[ ar_object_idx[ i ] ] | u(16) |
|                 ar_bounding_box_width[ ar_object_idx[ i ] ] | u(16) |
|                 ar_bounding_box_height[ ar_object_idx[ i ] ] | u(16) |
|                 if( ar_partial_object_flag_present_flag ) | |
|                     ar_partial_object_flag[ ar_object_idx[ i ] ] | u(1) |
|                 if( ar_object_confidence_info_present_flag ) | |
|                     ar_object_confidence[ ar_object_idx[ i ] ] | u(v) |
|             } | |
|         } | |
|     } | |
| } | |

START

S601
ACQUIRE IMAGE

S602
DETECT OBJECTS

S603
DETERMINE WHETHER TO
ENABLE GROUPING PROCESS

S604
IS GROUPING
PROCESS ENABLED?    NO

YES    S605
DETERMINE OBJECTS
AS GROUPING TARGETS

S606
ARE OBJECTS
AS GROUPING TARGETS
DETERMINED?    NO

YES    S607
GROUPING PROCESS

S608
OUTPUT OBJECT
INFORMATION

S609
GENERATE METADATA

END

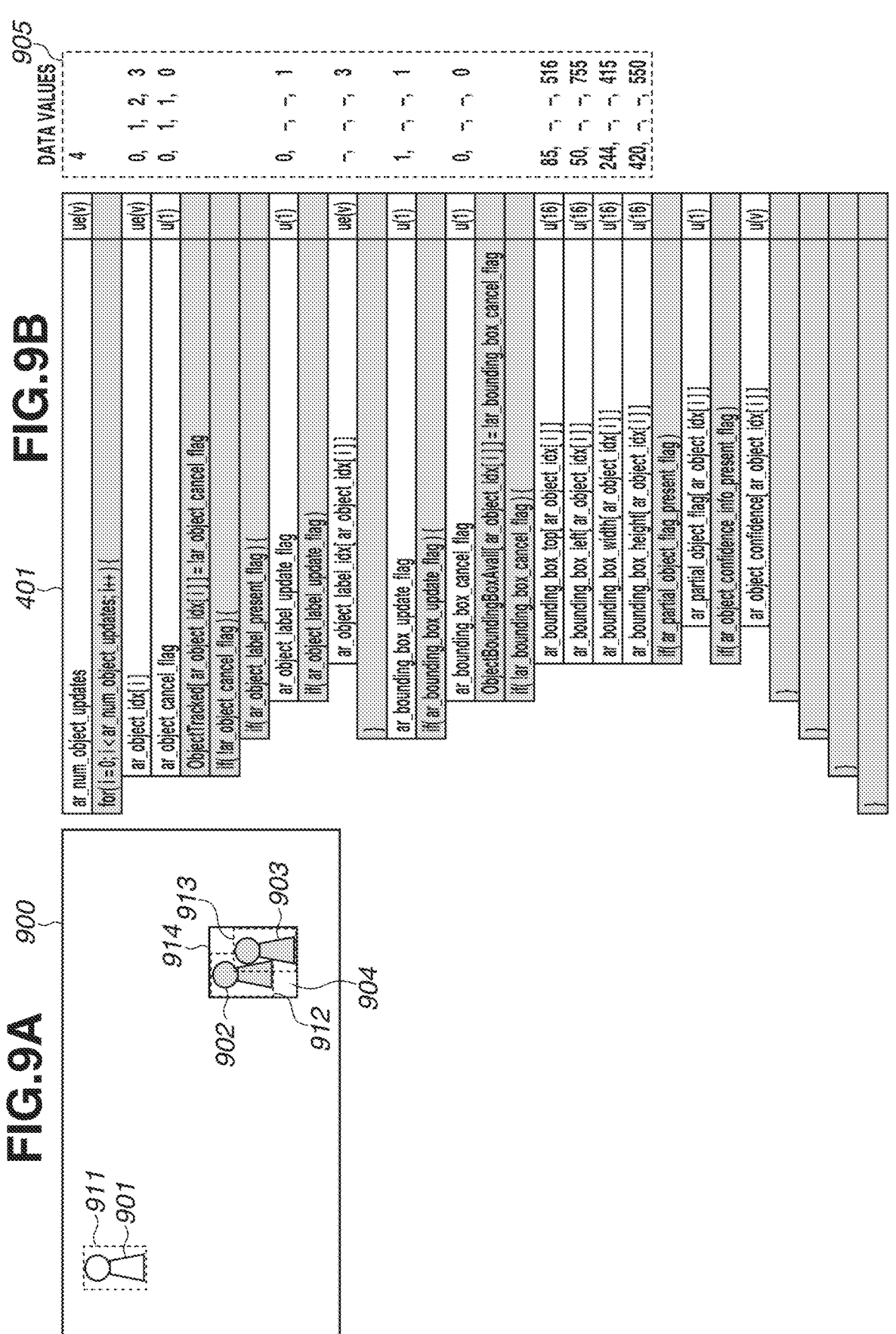

| | | DATA VALUES |
|---|---|---|
| ar_num_object_updates | ue(v) | 4 |
| for( i = 0; i < ar_num_object_updates; i++ ) { | ue(v) | 0, 1, 2, 3 |
| ar_object_idx[ i ] | u(1) | 0, 1, 1, 0 |
| ar_object_cancel_flag | | |
| ObjectTracked[ ar_object_idx[ i ] ] = !ar_object_cancel_flag | | |
| if( !ar_object_cancel_flag ) { | u(1) | 0, -, -, 1 |
| if( ar_object_label_present_flag ) { | | |
| ar_object_label_update_flag | u(1) | 1, -, -, 3 |
| if( ar_object_label_update_flag ) { | | |
| ar_object_label_idx[ ar_object_idx[ i ] ] | ue(v) | |
| } | | |
| ar_bounding_box_update_flag | u(1) | 1, -, -, 1 |
| if( ar_bounding_box_update_flag ) { | | |
| ar_bounding_box_cancel_flag | u(1) | 0, -, -, 0 |
| ObjectBoundingBoxAvail[ ar_object_idx[ i ] ] = !ar_bounding_box_cancel_flag | | |
| if( !ar_bounding_box_cancel_flag ) { | | |
| ar_bounding_box_top[ ar_object_idx[ i ] ] | u(16) | 85, -, -, 516 |
| ar_bounding_box_left[ ar_object_idx[ i ] ] | u(16) | 50, -, -, 755 |
| ar_bounding_box_width[ ar_object_idx[ i ] ] | u(16) | 244, -, -, 415 |
| ar_bounding_box_height[ ar_object_idx[ i ] ] | u(16) | 420, -, -, 550 |
| ar_partial_object_flag_present_flag | | |
| if( ar_partial_object_flag_present_flag ) | u(1) | |
| ar_partial_object_flag[ ar_object_idx[ i ] ] | | |
| if( ar_object_confidence_info_present_flag ) | | |
| ar_object_confidence[ ar_object_idx[ i ] ] | u(v) | |

INFORMATION GENERATION APPARATUS, INFORMATION GENERATION METHOD, AND STORAGE MEDIUM

BACKGROUND OF THE DISCLOSURE

Field of the Disclosure

The present disclosure relates to an information generation technique.

Description of the Related Art

In a video distribution server, a system that detects an object in an image using video content analysis (VCA), generates metadata regarding the object, and distributes the metadata to a client is widely prevalent.

The publication of Japanese Patent Application Laid-Open No. 2019-212963 discusses a technique for transmitting position information regarding objects detected from an image as metadata to a client apparatus.

In the publication of Japanese Patent Application Laid-Open No. 2019-212963, however, information such as position information regarding each of the objects detected from the image is individually stored in the metadata and transmitted to the client apparatus. Thus, the amount of information of the metadata may increase.

SUMMARY OF THE DISCLOSURE

According to an aspect of the present disclosure, an information generation apparatus includes a determination unit configured to determine, based on a predetermined condition, whether to enable a grouping process for grouping objects detected from an image, and a generation unit configured to generate metadata regarding the objects detected from the image, wherein, in a case where the determination unit determines that the grouping process is to be enabled, the determination unit determines a plurality of objects as grouping targets according to positional relationships between the objects detected from the image, and wherein the generation unit generates metadata including information regarding an integrated object obtained by integrating the plurality of objects determined as the grouping targets.

Further features of the present disclosure will become apparent from the following description of exemplary embodiments with reference to the attached drawings.

BRIEF DESCRIPTION OF THE DRAWINGS

FIGS. 2, 2A and 2B are diagrams illustrating a data structure compliant with annotated region supplemental enhancement information (ARSEI).

FIG. 3 is a diagram illustrating a part of the data structure compliant with ARSEI.

FIG. 4 is a diagram illustrating a part of the data structure compliant with ARSEI.

FIGS. 9A and 9B are diagrams illustrating a generation method for generating metadata.

DESCRIPTION OF THE EMBODIMENTS

The present disclosure will be described in detail below based on its suitable exemplary embodiments with reference to the attached drawings. The configurations illustrated in the following exemplary embodiments are merely examples, and the present disclosure is not limited to the configurations illustrated in the figures.

Figure 1:
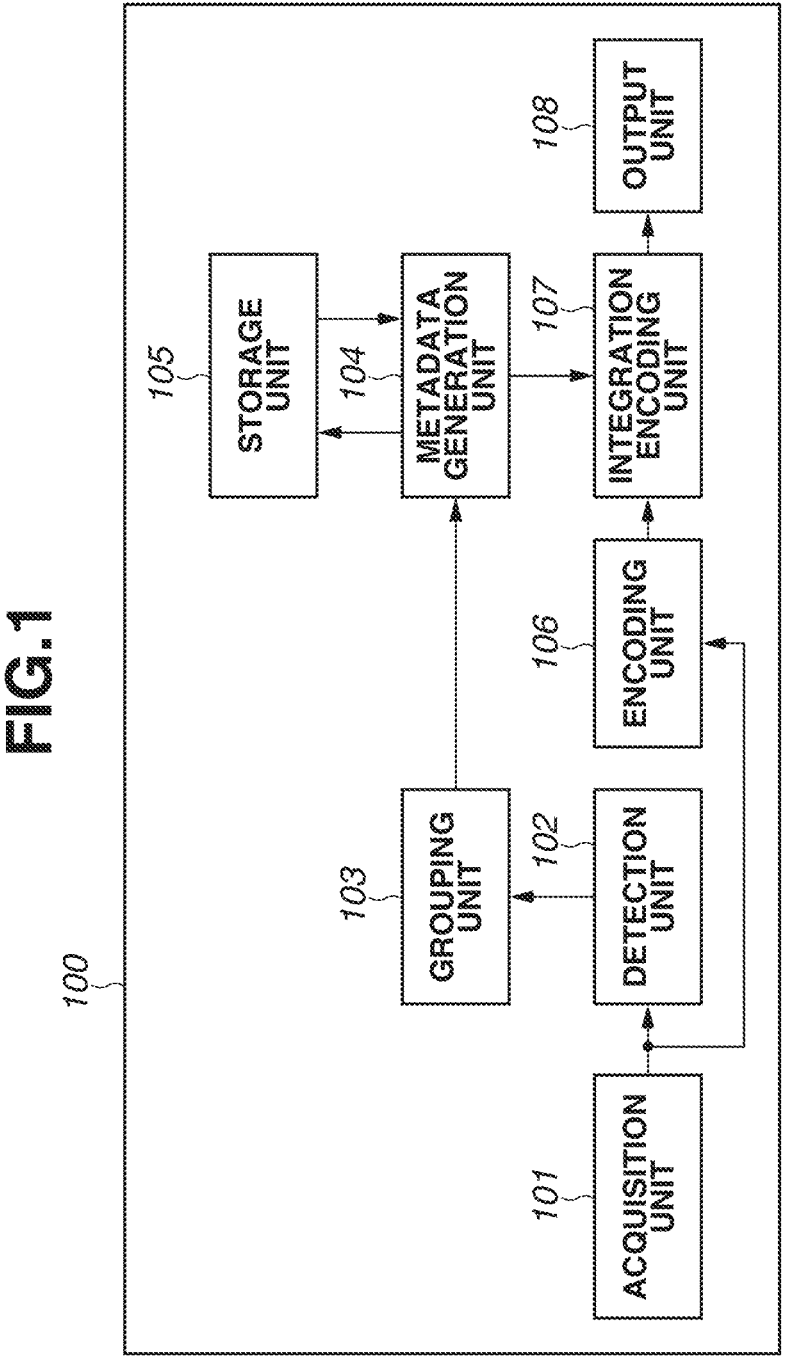
FIG. 1 is a diagram illustrating functional blocks of an information generation apparatus.

A first exemplary embodiment will be described below. FIG. 1 is a block diagram illustrating an information generation apparatus 100 that generates metadata according to the present exemplary embodiment. For example, functions illustrated in FIG. 1 are achieved as follows. That is, the functions are achieved by a central processing unit (CPU) 1000 of the information generation apparatus 100 described below with reference to FIG. 10 executing a computer program stored in a read-only memory (ROM) 1020 of the information generation apparatus 100.

In FIG. 1, an acquisition unit 101 acquires an image captured by an imaging apparatus (not illustrated). The acquisition unit 101 may acquire the image transmitted from the imaging apparatus via a network, or may acquire the image transmitted from a recording apparatus that records the image.

A detection unit 102 detects objects included in the image acquired by the acquisition unit 101.

The detection unit 102 outputs the result of detecting the objects from the image as detection result information. The detection result information includes position information regarding the region of each of the objects detected from the image and information regarding the type of the object. In addition to these pieces of information, the detection result information may also include information regarding the color, the shape, the action, the age, or the gender of each of the objects detected from the image.

Based on a predetermined condition, a grouping unit 103 determines whether to enable a grouping process for grouping the objects detected from the image. The details of this determination process will be described below. If the grouping unit 103 determines that the grouping process is to be enabled, the grouping unit 103 references the detection result information and determines a plurality of objects as grouping targets according to the positional relationships between the objects detected from the image. Then, as the grouping process, the grouping unit 103 integrates the plurality of objects determined as the grouping targets, thereby determining an integrated object. The grouping unit 103 generates object information regarding each of the integrated object obtained by the grouping by the grouping unit 103 and an object that is not grouped.

The object information includes, as various pieces of information regarding an object, an object index as an identifier of the object, a label name indicating the type of the object, and position information regarding the region of a circumscribed rectangle of the object in the image.

A metadata generation unit 104 generates metadata based on the object information input from the grouping unit 103. The metadata generation unit 104 stores the generated metadata in a storage unit 105.

An encoding unit 106 encodes the image input to the acquisition unit 101, thereby generating encoded data. Then, the encoding unit 106 outputs the encoded data. The encoding unit 106 according to the present exemplary embodiment encodes the image using H.265, thereby generating encoded data. Alternatively, the encoding unit 106 may encode the image using another moving image coding standard such as H.264 or H.266. An integration encoding unit 107 integrates the metadata output from the metadata generation unit 104 and the encoded data output from the encoding unit 106, thereby forming a bit stream. Then, the integration encoding unit 107 outputs the bit stream. An output unit 108 outputs the bit stream generated by the integration encoding unit 107 to a client apparatus (not illustrated) via the network.

With reference to FIGS. 2A and 2B, the metadata generated by the metadata generation unit 104 will be more specifically described. As the format of the metadata, an annotated region supplemental enhancement information (SEI) message (hereinafter, "ARSEI") in H.265 is used. Metadata 200 illustrated in FIG. 2 is metadata according to the present exemplary embodiment and has a data structure compliant with ARSEI. The metadata generation unit 104 can generate the metadata by storing numerical values in various syntax elements in this data structure.

Partial metadata 300 illustrated in FIG. 3 is a part of the metadata 200 and is information described by setting "ar_object_label_present_flag" to "1". Using the partial metadata 300, it is possible to notify the client apparatus of information regarding a label name ("ar_label") capable of indicating the type of an object.

Specifically, in the partial metadata 300, the metadata generation unit 104 inserts the number of label names ("ar_label") of which the metadata generation unit 104 should notify the client apparatus into "ar_num_label_updates". In the following description, a case is assumed where the metadata generation unit 104 should define a label name "personA" and a label name "personB" and notify the client apparatus of these label names. At this time, "ar_num_label_updates" is 2. Next, the metadata generation unit 104 inserts the identification numbers of as many labels as the numerical value of "ar_num_label_updates" into "ar_label_idx[i]". For example, the metadata generation unit 104 sets "ar_label_idx[0]"=0 and "ar_label_idx[1]"=1. Then, the metadata generation unit 104 inserts a label name corresponding to the identification number of each label into "ar_label[ar_label_idx[i]]". For example, the metadata generation unit 104 sets "ar_label[ar_label_idx[0]]"="personA" and "ar_label[ar_label_idx[1]]"="personB". By generating the partial metadata 300 as described above, it is possible to define each of the association between the label index ("ar_label_idx") "0" and the label (a first label) "personA" and the association between the label index ("ar_label_idx") "1" and the label (a second label) "personB". The client apparatus having acquired the metadata 200 including partial metadata 300 can obtain each of the association between the label index ("ar_label_idx") "0" and the label "personA" and the association between the label index ("ar_label_idx") "1" and the label name "personB" as information.

Next, partial metadata 400 illustrated in FIG. 4 is a part of the metadata 200 and is information described by setting "ar_num_object_updates" to a non-zero value. The partial metadata 400 can describe a label name corresponding to each object present in the image and position information regarding the region where the object is present.

Specifically, the metadata generation unit 104 inserts the number of objects regarding which information is updated for the client apparatus into "ar_num_object_updates". As an example, a case is considered below where information is updated regarding a first object and a second object in the image. At this time, the metadata generation unit 104 sets a numerical value "2" as "ar_num_object_updates". Next, the metadata generation unit 104 inserts the indices of as many objects as the number of "ar_num_object_updates" into "ar_object_idx[i]". It is assumed that "1" is assigned as the object index of the first object, and "2" is assigned as the object index of the second object. At this time, the metadata generation unit 104 sets "ar_object_idx[0]"=1 and "ar_object_idx[1]"=2. Next, the metadata generation unit 104 sets "ar_object_label_update_flag" to '1' as many times as the number indicated by "ar_num_object_updates", then selects an identification number corresponding to each object present in the image from the identification numbers of the above labels, and inserts the selected identification number into "ar_object_label_idx[ar_object_idx[i]]". For example, to associate the label name ("ar_label") "personA" with the first object, the metadata generation unit 104 sets "ar_object_label_idx[ar_object_idx[0]]" to the label index ("ar_label_idx") "0" corresponding to the label name ("ar_label") "personA". That is, the metadata generation unit 104 sets "ar_object_label_idx[ar_object_idx[0]]"=0. In this manner, the metadata generation unit 104 can associate the object index "1" of the first object and the label index "0" of the label name "personA".

The metadata generation unit 104 also stores "ar_bounding_box_top [ar_object_idx[i]]", "ar_bounding_box_left [ar_object_idx[i]]", "ar_bounding_box_width[ar_object_idx[i]]", and "ar_bounding_box_height[ar_object_idx[i]]" as position information regarding the region of each object in the metadata 200. "ar_bounding_box_top[ar_object_idx[i]]" and "ar_bounding_box_left[ar_object_idx[i]]" indicate the coordinates of the top left of the region of the object. "ar_bounding_box_width[ar_object_idx[i]]" indicates the width of the region of the object, and "ar_bounding_box_height[ar_object_idx[i]]" indicates the height of the region of the object.

As described above, in the update of information regarding an object using the metadata 200, it is possible to add information regarding the label name of an object that can be present in the image and the region of an object present in the image. On the other hand, it is also possible to delete these pieces of information using predetermined flags. For example, by setting "ar_label_cancel_flag" to 1, it is possible to delete corresponding information regarding "ar_label_idx[i]". By setting "ar_object_cancel_flag" to 1, it is possible to delete (cancel) the association between an object index and a label index using "ar_object_label_idx[ar_object_idx]". By setting "ar_bounding_box_cancel_flag" to '1', it is possible to delete (cancel) the position information ("ar_bounding_box_top [ar_object_idx[i]]", "ar_bounding_box_left[ar_object_idx[i]]", "ar_bounding_box_width [ar_object_idx[i]]", and "ar_bounding_box_height[ar_object_idx[i]]") regarding the region of a corresponding object.

The metadata generation unit 104 may not signal the information in the partial metadata 400 to the metadata 200 by setting "ar_num_object_updates" to "0", and may signal the information in the partial metadata 300 to the metadata 200 by setting "ar_object_label_present_flag" to "1". For example, before the encoded data of the image is distributed to the client apparatus, the metadata generation unit 104 may signal the information in the partial metadata 300 to the metadata 200 and distribute the information to the client apparatus in advance. At this time, the metadata generation unit 104 can send information regarding a label which the metadata generation unit 104 should notify the client apparatus in advance in the partial metadata 300 to the client. For example, as described above, the metadata generation unit 104 can set "ar_label_idx[0]"=0 and "ar_label[ar_label_idx [0]]"="personA" and further set "ar_label_idx[1]"=1 and "ar_label[ar_label_idx[1]]"="personB". Then, the metadata generation unit 104 can notify the client apparatus of the metadata 200 including these pieces of information in advance. At this time, the client apparatus can acquire the association between the label index ("ar_label_idx") "0" and the label name ("ar_label") "personA" and the association between the label index ("ar_label_idx") "1" and the label name ("ar_label") "personB" as information in advance of the reception of the image data.

Then, in subsequent processing, for example, the metadata generation unit 104 may not signal the information in the partial metadata 300 to the metadata 200 by setting "ar_object_label_present_flag" to "0", and may signal the information in the partial metadata 400 to the metadata 200 by setting "ar_num_object_updates" to "1". At this time, the metadata generation unit 104 does not update the association between a label index and a label name or add a new label name, and can update a label name associated with an object detected from an image as a current processing target and the position information regarding the region of the object.

Figure 5:
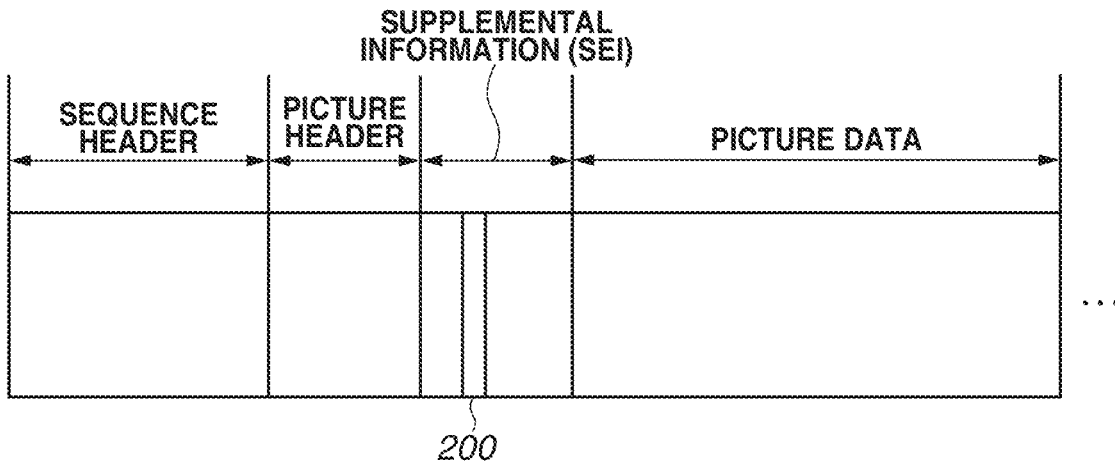
FIG. 5 is a diagram illustrating an example of a structure of a generated bit stream.

FIG. 5 illustrates an example of a bit stream including the metadata 200 generated by the integration encoding unit 107. The metadata 200 can be included in any of a sequence header that stores a parameter regarding a sequence, a picture header that stores a parameter regarding a picture, and a header of supplemental information (SEI). In the present exemplary embodiment, as illustrated in FIG. 5, the metadata 200 is included in SEI. SEI can be added to picture data of each of a plurality of different images.

Figure 6:
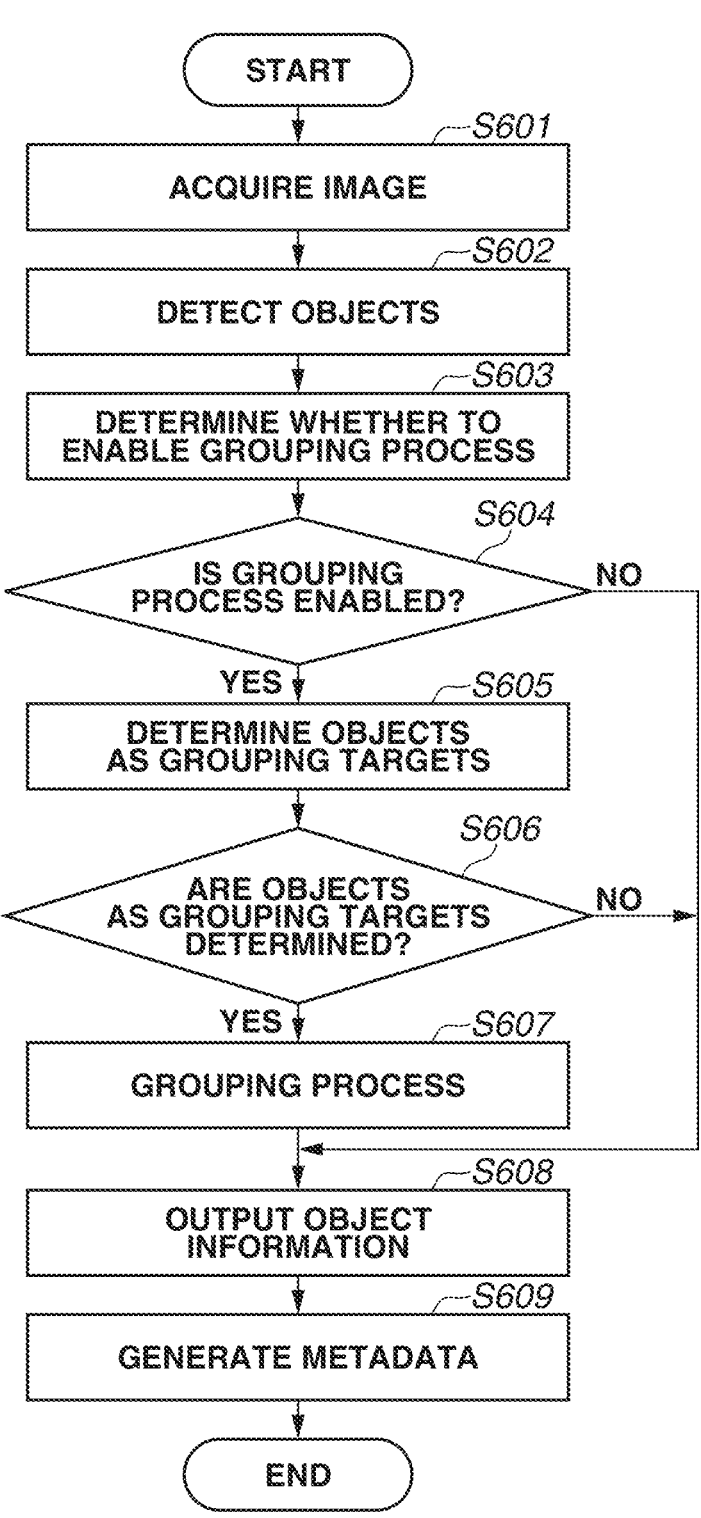
FIG. 6 is a flowchart illustrating a flow of an information generation process.

With reference to FIG. 6, an information generation process of the information generation apparatus 100 according to the first exemplary embodiment will be described below. For example, the processing of a flow illustrated in FIG. 6 is executed by the functional blocks of the information generation apparatus 100 illustrated in FIG. 1 achieved by the CPU 1000 of the information generation apparatus 100 executing a computer program stored in the ROM 1020 of the information generation apparatus 100.

First, in step S601, the acquisition unit 101 acquires an image transmitted from the imaging apparatus or the image recording apparatus as a processing target image. Next, in step S602, the detection unit 102 detects objects included in the processing target image and outputs the objects as detection result information.

Next, in step S603, based on a predetermined condition, the grouping unit 103 determines whether to enable a grouping process for grouping the objects detected from the image.

The details of this enabling determination based on the predetermined condition will be described below. If it is determined that the grouping process is enabled (Yes in step S604), the processing proceeds to step S605. If, on the other hand, it is determined that the grouping process is disabled (No in step S604), the processing proceeds to step S608.

In step S605, the grouping unit 103 references the detection result information regarding the processing target image and determines a plurality of objects as grouping targets according to the positional relationships between the objects detected from the image. Specifically, if the distance between a certain object and another object detected from the image is less than a predetermined threshold, the grouping unit 103 determines these objects as grouping targets.

The distance between the certain object and another object is, for example, the distance (pixels) on the image between the position of the center of gravity of a circumscribed rectangle of the certain object and the position of the center of gravity of a circumscribed rectangle of another object. Alternatively, the grouping unit 103 may determine a plurality of objects as grouping targets according to the degree of overlap between the regions of the circumscribed rectangles of the respective objects. For example, the ratio of "the area of overlap between the region of the certain object and the region of another object" to "the sum of the area of the region of the circumscribed rectangle of the certain object and the area of the region of the circumscribed rectangle of another object" can be used as the degree of overlap. The grouping unit 103 compares the degree of overlap calculated regarding the certain object and another object and a threshold. If the degree of overlap is greater than or equal to the threshold, the grouping unit 103 determines the certain object and another object as grouping targets.

Next, if a plurality of objects as grouping targets is determined among the objects detected from the processing target image (Yes in step S606), the processing proceeds to step S607. If, on the other hand, a plurality of objects as grouping targets is not determined (No in step S606), the processing proceeds to step S608.

In step S607, the grouping unit 103 groups the plurality of objects as the grouping targets determined in step S605, thereby determining a single integrated object. In step S608, the grouping unit 103 outputs object information regarding each of the integrated object obtained by the grouping in step S607 and an object that is not subjected to the grouping process in step S607.

In step S609, the metadata generation unit 104 generates metadata based on the object information output in step S608. The metadata generation unit 104 also stores the object information included in the generated metadata in the storage unit 105. The metadata generated as described above is integrated with SEI and transmitted as a bit stream to the client apparatus.

Figure 7:
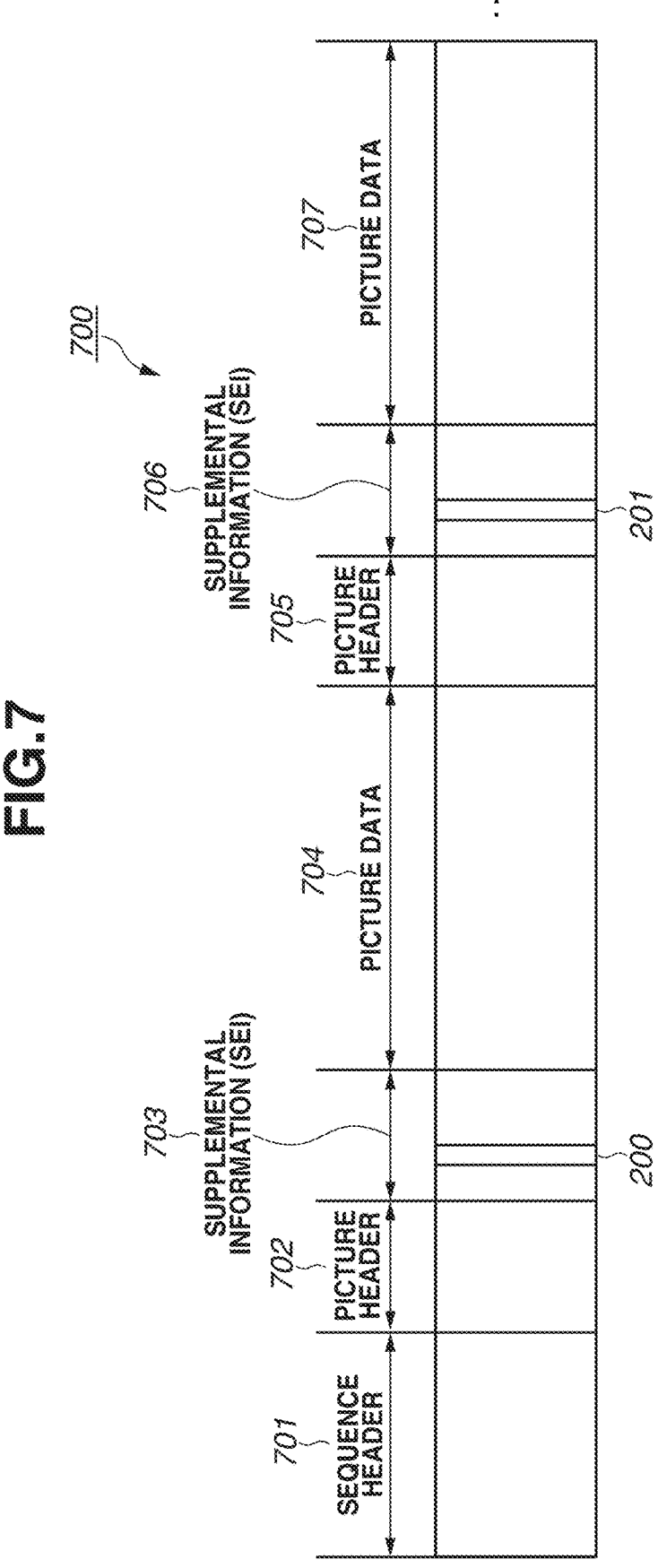
FIG. 7 is a diagram illustrating an example of a structure of a bit stream.

With reference to FIGS. 7 to 9B, a specific example of the metadata generated by the metadata generation unit 104 will be illustrated. FIG. 7 illustrates a bit stream 700 generated by the integration encoding unit 107.

The bit stream 700 illustrated in FIG. 7 includes a sequence header 701 including a parameter regarding a video sequence. The bit stream 700 also includes a picture header 702 that stores a parameter regarding an image 800, SEI 703 regarding the image 800, and picture data 704 which is encoded data of the image 800. Similarly, the bit stream 700 includes a picture header 705 that stores a parameter regarding an image 900, SEI 706 regarding the image 900, and picture data 707 which is encoded data of the image 900.

The integration encoding unit 107 stores metadata 200 generated by the metadata generation unit 104 regarding objects detected from the image 800 in the SEI 703 and stores metadata 201 generated by the metadata generation unit 104 regarding objects detected from the image 900 in the SEI 706. With such a bit stream, the information generation apparatus 100 can notify the client apparatus of information regarding the objects related to the image 800 using the metadata 200 and information regarding the objects related to the image 900 using the metadata 201.

Figures 8A, 8B:
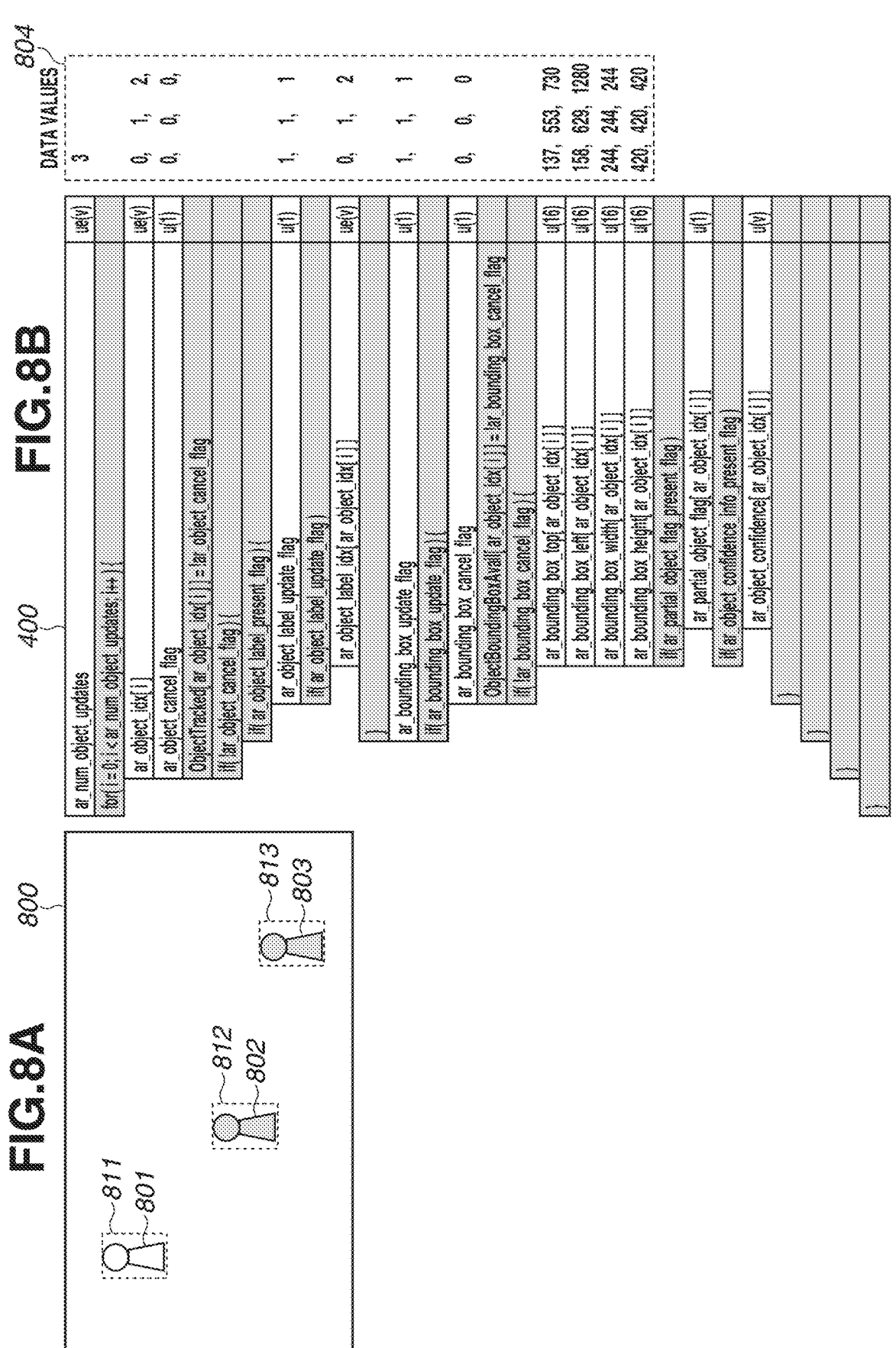
FIGS. 8A and 8B are diagrams illustrating a generation method for generating metadata.

With reference to FIGS. 8A and 8B, a description will be given of the image 800 and the metadata 200 generated regarding the image 800. FIG. 8A illustrates the image 800, and FIG. 8B illustrates partial metadata 400 which is a part of the metadata 200 generated regarding the image 800. In the image 800, objects 801 to 803 are present. The detection unit 102 detects the objects 801 to 803 from the image 800 and outputs detection result information. The detection unit 102 according to the present exemplary embodiment can also determine the types of the objects 801 to 803. For example, the detection unit 102 determines that the type of each of the objects 801 to 803 is a person. The detection result information includes the object index of each of the objects 801 to 803 detected from the image 800, position information regarding the position of the region of each of the objects 801 to 803 on the image, and information regarding the type of each of the objects 801 to 803.

The grouping unit 103 determines a plurality of objects as grouping targets based on the positional relationships between the objects 801 to 803 detected from the image 800. Specifically, for example, the grouping unit 103 determines a plurality of objects as grouping targets according to the result of comparing the distances between the objects 801 to 803 detected from the image 800 and the threshold. In the example of the image 800, all the distances between the objects 801 to 803 are greater than or equal to the threshold. In this case, the grouping unit 103 determines that none of the objects 801 to 803 in the image 800 is a grouping target.

Examples of specific data values stored in the partial metadata 400 by the metadata generation unit 104 are data values 804 illustrated in FIG. 8B. Since information is updated regarding the three detected objects 801 to 803, the metadata generation unit 104 sets "ar_num_object_updates" to "3". The metadata generation unit 104 also sets the object index ("ar_object_idx[0]") of the object 801 to "0", sets the object index ("ar_object_idx[1]") of the object 802 to "1", and sets the object index ("ar_object_idx[2]") of the object 803 to "2". To update the associations between the object indices and labels, the metadata generation unit 104 sets "ar_object_label_update_flag" to '1' regarding i=0 to 2. A label ("ar_label") corresponding to a label index ("ar_label_idx") "0" is defined as "personA" in advance, a label ("ar_label") corresponding to a label index ("ar_label_idx") "1" is defined as "personB" in advance, and a label ("ar_label") corresponding to a label index ("ar_label_idx") "2" is defined as "personC" in advance. Then, to associate the object index ("ar_object_idx[0]") "0" of the object 801 and the label ("ar_label") "personA" corresponding to the label index ("ar_label_idx") "0", the metadata generation unit 104 sets "ar_object_label_idx[ar_object_idx[0]]"=0. Similarly, to associate the object index ("ar_object_idx[1]") "1" of the object 802 and the label ("ar_label") "personB" corresponding to the label index ("ar_label_idx") "1", the metadata generation unit 104 sets "ar_object_label_idx[ar_object_idx[1]]"=1. Similarly, to associate the object index ("ar_object_idx[2]") "2" of the object 803 and the label ("ar_label") "personC" corresponding to the label index ("ar_label_idx") "2", the metadata generation unit 104 sets "ar_object_label_idx[ar_object_idx[2]]"=2.

The metadata generation unit 104 also sets "ar_bounding_box_top [ar_object_idx [0]]"=137, "ar_bounding_box_left[ar_object_idx[0]]"=158, "ar_bounding_box_width [ar_object_idx[0]]"=244, and "ar_bounding_box_height [ar_object_idx[0]]"=420 as position information regarding a region 811 of a circumscribed rectangle of the object 801.

Similarly, the metadata generation unit 104 sets "ar_bounding_box_top [ar_object_idx [1]]"=553, "ar_bounding_box_left[ar_object_idx[1]]"=629, "ar_bounding_box_width[ar_object_idx[1]]"=244, and "ar_bounding_box_height[ar_object_idx[1]]"=420 as position information regarding a region 812 of a circumscribed rectangle of the object 802.

Similarly, the metadata generation unit 104 sets "ar_bounding_box_top [ar_object_idx [2]]"=730, "ar_bounding_box_left[ar_object_idx[2]]"=1280, "ar_bounding_box_width[ar_object_idx[2]]"=244, and "ar_bounding_box_height[ar_object_idx[2]]"=420 as position information regarding a region 813 of a circumscribed rectangle of the object 803.

By generating the metadata 200 including the partial metadata 400 as described above, it is possible to notify the client apparatus that the objects 801, 802, and 803 in the image 800 are "personA", "personB", and "personC", respectively, and of the position information regarding each of the objects 801, 802, and 803.

The metadata generation unit 104 stores the position information regarding the object 801 and the object index ("ar_object_idx") "0" of the object 801 in association with each other in the storage unit 105. Similarly, the metadata generation unit 104 stores the position information regarding the object 802 and the object index ("ar_object_idx") "1" of the object 802 in association with each other in the storage unit 105. Similarly, the metadata generation unit 104 stores the position information regarding the object 803 and the object index ("ar_object_idx") "2" of the object 803 in association with each other in the storage unit 105. When the metadata generation unit 104 generates metadata regarding an image acquired after the image 800, the metadata generation unit 104 may execute the following process. That is, if various pieces of information (the object index and the position information) regarding a certain object are stored in metadata generated in the past, the metadata generation unit 104 may store information ("ar_object_cancel_flag"=1) for deleting the various pieces of information regarding the object in the metadata.

With reference to FIGS. 9A and 9B, a description will be given of the image 900 which is an image of a frame temporally later than the image 800 and the metadata 201 generated regarding the image 900. FIG. 9A illustrates the image 900, and FIG. 9B illustrates partial metadata 401 which is a part of the metadata 201 generated regarding the image 900. In the image 900, objects 901 to 903 are present. The objects 901 to 903 are the same as the objects 801 to 803, respectively. The detection unit 102 detects the objects 901 to 903 from the image 900 and outputs detection result information. The detection result information includes the object index of each of the objects 901 to 903 detected from the image 900, position information regarding the position of the region of each of the objects 901 to 903 on the image, and information regarding the type of each of the objects 901 to 903. The object indices of the objects 901 to 903 and the pieces of information regarding the types of the objects 901 to 903 are the same as those of the objects 801 to 803. The grouping unit 103 determines grouping targets based on the distances between the objects 901 to 903 detected from the image 900. In the example of the image 900, the grouping unit 103 determines that the distance between the objects 901 and 902 and the distance between the objects 901 and 903 are greater than or equal to the predetermined threshold. On the other hand, the grouping unit 103 determines that the distance between the objects 902 and 903 is less than the predetermined threshold. Then, the grouping unit 103 determines the objects 902 and 903 as grouping targets. Object information regarding the object 901 output from the grouping unit 103 includes the object index "0" of the object 901, the type "personA", and position information regarding a region 911 of a circumscribed rectangle of the object 901. Object information regarding an integrated object 904 includes the object index "3" of the object 904 and position information regarding a region 914 of the integrated object 904.

The object information regarding the integrated object 904 also includes grouping information indicating that the objects 902 and 903 are grouped and treated as the same object. As the grouping information, information "1-2-3" obtained by connecting the object index "1" of the object 902, the object index "2" of the object 903, and the object index "3" of the object 904 by "-" may be used. The grouping information is not limited to this, and may be represented by another method so long as the grouping information can indicate the inclusion relationship between the objects and the group.

Based on the object information output from the grouping unit 103, the metadata generation unit 104 stores data values 905 illustrated in FIG. 9B as specific data values in the partial metadata 401.

Using the partial metadata 401, it is possible to update the position information regarding the region of the object 901, delete (cancel) the information regarding the objects 902 and 903, and then newly notify the client apparatus of the information regarding the integrated object 904.

The partial metadata 401 will be further specifically described. As indicated by the data values 905, the metadata generation unit 104 sets "ar_num_object_updates" to '4' as the number of objects regarding which information is updated for the image 900. Then, the metadata generation unit 104 sets "ar_object_idx[0]" to the object index "0" of the object 901, sets "ar_object_idx[1]" to the object index "1" of the object 902, sets "ar_object_idx[2]" to the object index "2" of the object 903, and then sets ar_object_idx[3] to the object index "3" of the integrated object 904.

To delete the various pieces of information (the association between the object index and the label name and the position information) regarding the objects 902 and 903 as the integrated object, the metadata generation unit 104 executes the following process. That is, as indicated by the data values 905, the metadata generation unit 104 sets "ar_object_cancel_flag" to "1" regarding i=1 (the object 902) and i=2 (the object 903). Since "ar_object_cancel_flag" is set to "1" regarding i=1 (the object 902) and i=2 (the object 903), as indicated by the data values 905, the various pieces of information (the position information) regarding the objects 902 and 903 are blank in a syntax element following "ar_object_cancel_flag" in the partial metadata 401. On the other hand, to update the various pieces of information (the position information) regarding the object 901 and the integrated object 904, the metadata generation unit 104 executes the following process. That is, the metadata generation unit 104 sets "ar_object_cancel_flag" to 0 regarding i=0 (the object 901) and i=3 (the integrated object 904).

In the metadata 201, the metadata generation unit 104 also defines a label ("ar_label") "personB+personC" for a label index ("ar_label_idx") "3" and then executes the following process. That is, the metadata generation unit 104 sets "ar_object_label_idx[ar_object_idx[3]]"=3. In this manner, the metadata generation unit 104 can associate a label name obtained by combining the type ("personB") of the object 902 and the type ("personC") of the object 903 with the integrated object 904. By generating the partial metadata 401 as described above, it is possible to notify the client apparatus that the objects 902 and 903 in the image 900 are grouped as "personB+personC". As described above, the client is notified of a single object obtained by grouping detected objects, whereby it is possible to notify the client of information regarding the objects with the minimum amount of information.

The metadata generation unit 104 also sets "ar_bounding_box_top[ar_object_idx[0]]"=85, "ar_bounding_box_left[ar_object_idx[0]]"=50, "ar_bounding_box_width [ar_object_idx[0]]"=244, and "ar_bounding_box_height [ar_object_idx[0]]"=420 as the position information regarding the region 911 of the circumscribed rectangle of the object 901 having the object index "0".

The metadata generation unit 104 also sets "ar_bounding_box_top [ar_object_idx [3]]"=516, "ar_bounding_box_left[ar_object_idx[3]]"=755, "ar_bounding_box_width [ar_object_idx[3]]"=415, and "ar_bounding_box_height [ar_object_idx[3]]"=550 as the position information regarding the region 914 of the circumscribed rectangle of the integrated object 904 having the object index "3".

As described above, the metadata generation unit 104 signals the position information regarding the object 901 and the integrated object 904 to the partial metadata 401, and does not signal the position information regarding the objects 902 and 903 to the partial metadata 401. As described above, the position information regarding each of the objects 902 and 903 is not signaled to the metadata 201, but the position information regarding the single integrated object obtained by integrating the objects 902 and 903 is signaled to the metadata 201, whereby it is possible to prevent an increase in the amount of information of metadata.

Although metadata is included in SEI as illustrated in FIG. 5 in the present exemplary embodiment, the position of the metadata is not limited to this. The metadata may be included in a sequence header portion or a picture header portion, or may be inserted into a bit stream at another position or in another form.

Although information regarding objects before being grouped (the objects 802 and 803) is deleted (cancelled) using the partial metadata 401 after the objects are grouped in the present exemplary embodiment, the client apparatus may be notified of the information regarding the objects before being grouped as it is without deleting the information.

Although the grouping unit 103 according to the present exemplary embodiment groups objects in an image if the distance between the objects is less than the predetermined threshold, the grouping method is not limited to this. The grouping unit 103 may group objects based on various feature amounts related to the types, the positions, the sizes, the colors, the shapes, the motions, and the ages of the objects.

The information generation apparatus 100 according to the present exemplary embodiment transmits, to the client apparatus, metadata in which the label (e.g., "personB+personC") of a grouped integrated object is defined. The information generation apparatus 100 also transmits, to the client apparatus, metadata in which the labels (e.g., "personB" and "personC") of respective objects included in the integrated object are defined. Consequently, based on the label of the integrated object and the labels of the respective objects, the client apparatus can identify which objects are included in the integrated object. It may be indicated which objects are included in the integrated object not only based on the label names of the objects but also by another method.

As a label ("ar_label") associated with an integrated object, the metadata generation unit 104 may describe information indicating the number of objects included in the integrated object. For example, the metadata generation unit 104 identifies the number of objects included in the integrated object 904 as "2" and sets a label ("ar_label") associated with the integrated object 904 to "2persons". In this manner, it is possible to notify the client apparatus of the number of detected objects included in an integrated object.

A description will be given of the method for determining whether to enable the grouping process in step S603 in FIG. 6. Based on the predetermined condition, the grouping unit 103 according to the present exemplary embodiment determines whether to enable the grouping process for grouping the objects. As the predetermined condition, for example, in a case where some or all of the objects are included in a region of interest (ROI) set in the image, the grouping process is enabled. If the grouping process is enabled, then based on the distances between the objects included in the ROI, the grouping unit 103 determines whether to set the objects included in the ROI as grouping targets.

Alternatively, as the predetermined condition, for example, information regarding the communication band of the network may be used. At this time, for example, the grouping unit 103 acquires data transfer bits per second (bps) as information regarding the communication band of the current network. If the data transfer bps is less than a threshold, the grouping unit 103 determines that the communication band of the network is narrow. If the data transfer bps is greater than or equal to the threshold, the grouping unit 103 determines that the communication band is wide. Then, as the predetermined condition, if the grouping unit 103 determines that the communication band is narrow, the grouping unit 103 may enable the grouping process.

Yet alternatively, as the predetermined condition, the grouping unit 103 may determine whether the number of objects included in the image exceeds a threshold. If the grouping unit 103 determines that the number of objects detected by the object detection unit 102 exceeds a predetermined threshold, the grouping unit 103 enables the grouping process. If, on the other hand, the number of objects detected by the object detection unit 102 is less than or equal to the threshold, the grouping unit 103 disables the grouping process. The threshold to be compared with the number of objects can be the maximum number that can be assigned as an object index. For example, since 0 to 255 can be assigned as "ar_object_idx[i]" in ARSEI, 256 may be used as the threshold.

As described above, based on a predetermined condition, the information generation apparatus 100 according to the present exemplary embodiment determines whether to enable a grouping process for grouping objects detected from an image. Then, if the information generation apparatus 100 determines that the grouping process is to be enabled, the information generation apparatus 100 determines a plurality of objects as grouping targets according to the positional relationships between the objects detected from the image. Then, the information generation apparatus 100 generates metadata including information regarding an integrated object obtained by integrating the plurality of objects determined as the grouping targets. As described above, metadata that individually stores information regarding each of the objects detected from the image is not generated, but metadata stores information regarding the single integrated object obtained by adaptively integrating the plurality of objects. In this manner, it is possible to prevent an increase in the amount of information of metadata.

(Variations)

The metadata generation unit 104 may further store information regarding a value indicating the certainty (the confidence value) of a detected object in the metadata described in the first exemplary embodiment. For example, based on the quality of a processing target image or the detection accuracy of an object detected by the detection unit 102, the metadata generation unit 104 may increase or decrease the degree of confidence of the object. The detection accuracy of the object refers to, for example, in a case where a person is detected from an image by pattern matching, the matching value of a person pattern used in the pattern matching and a partial region detected as a person from the image. The certainty of a physical body being a detection target (e.g., a person) obtained not only by pattern matching but also using another detection method may be used as the detection accuracy of the object.

A description will be given of a method for calculating the degree of confidence of an integrated object obtained by integrating a plurality of objects. Based on the confidence values of objects to be grouped, the metadata generation unit 104 calculates the degree of confidence of an integrated object obtained by integrating the objects. Specifically, the metadata generation unit 104 weights the confidence values of the objects to be grouped by the areas of the regions of the objects and further divides the weighted confidence values by the size of the region of the integrated object obtained by integrating the objects, whereby the degree of confidence of the integrated object can be calculated. For example, the confidence value of the integrated object 904 in the image 900 in FIG. 9A is calculated using the following formula (1).

$$\begin{aligned}\text{(The confidence value of the object 904)}=&((\text{the area}\\&\text{of the region 912 of the object 902})*(\text{the confi-}\\&\text{dence value of the object 902})+(\text{the area of the}\\&\text{region 913 of the object 903})*(\text{the confidence}\\&\text{value of the object 903}))/(\text{the area of the region}\\&\text{914 of the integrated object 904}) \quad\text{formula (1)}\end{aligned}$$

The metadata generation unit 104 describes the degree of confidence of an object in the metadata by the following process. That is, in the data structure of the metadata 200 in FIG. 2, the metadata generation unit 104 may set "ar_confidence_info_present_flag" to '1', set "ar_object_confidence_length_minus1" to a value obtained by subtracting 1 from the number of bits for representing the confidence value, and insert the confidence value into "ar_object_confidence[ar_object_idx[i]]" regarding each object. By the above method, it is possible to notify the client of the confidence values regarding grouped objects.

Other Exemplary Embodiments

Figure 10:
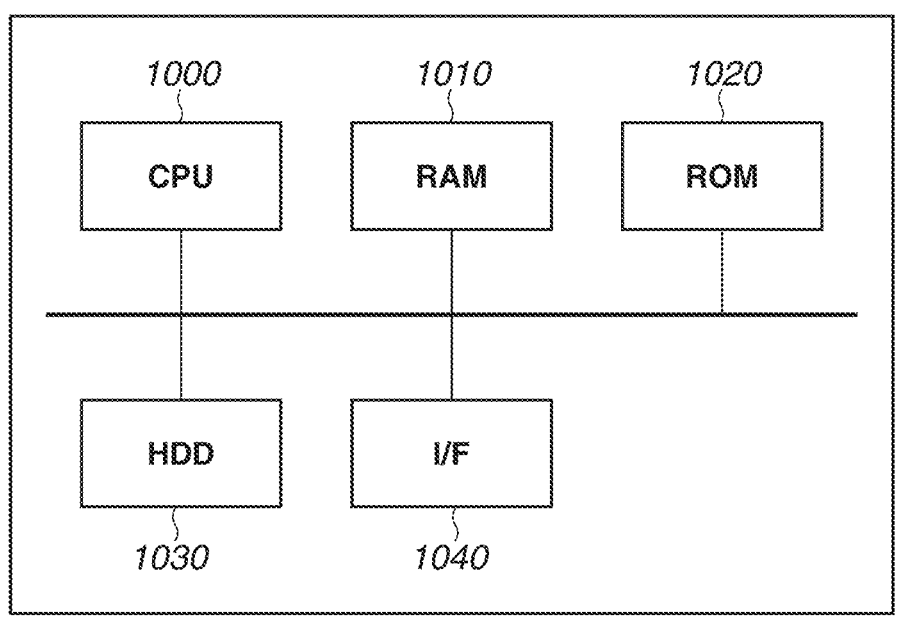
FIG. 10 is a diagram illustrating a hardware configuration of the information generation apparatus.

Next, with reference to FIG. 10, the hardware configuration of the information generation apparatus 100 will be described. The information generation apparatus 100 includes a CPU 1000, a random-access memory (RAM) 1010, a ROM 1020, a hard disk drive (HDD) 1030, and an interface (UF) 1040.

The CPU 1000 is a central processing unit that performs overall control of the information generation apparatus 100. The RAM 1010 temporarily stores a computer program executed by the CPU 1000. The RAM 1010 provides a work area used by the CPU 1000 to execute processing. For example, the RAM 1010 functions as a frame memory or functions as a buffer memory.

The ROM 1020 stores a program for the CPU 1000 to control the information generation apparatus 100. The HDD 1030 is a storage device that records image data. The OF 1040 communicates with an external apparatus according to the Transmission Control Protocol/Internet Protocol (TCP/IP) or the Hypertext Transfer Protocol (HTTP) via the network.

Although an example where the CPU 1000 executes processing is described in the above exemplary embodiments, at least a part of the processing of the CPU 1000 may be performed by dedicated hardware. For example, the process of reading a program code from the ROM 1020 and loading the program code into the RAM 1010 may be executed by direct memory access (DMA) that functions as a transfer apparatus.

The present disclosure can be achieved also by the process of causing one or more processors to read and execute a program for achieving one or more functions of the above exemplary embodiments. The program may be supplied to a system or an apparatus including the one or more processors via a network or a storage medium.

The present disclosure can be achieved also by a circuit (e.g., an application-specific integrated circuit (ASIC)) for achieving the one or more functions of the above exemplary embodiments. The components of the information generation apparatus 100 may be achieved by the hardware illustrated in FIG. 10, or can also be achieved by software.

While the present disclosure has been described together with exemplary embodiments, the above exemplary embodiments merely illustrate specific examples for carrying out the present disclosure, and the technical scope of the present disclosure should not be interpreted in a limited manner based on these exemplary embodiments. That is, the present disclosure can be carried out in various ways without departing from the technical idea or the main feature of the present disclosure. For example, the combinations of the exemplary embodiments are also included in the disclosed content of the specification.

According to the exemplary embodiments of the present disclosure, it is possible to prevent an increase in the amount of information in metadata related to information regarding a physical body detected from an image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-092383, filed Jun. 7, 2022, which is hereby incorporated by reference herein in its entirety.

What is claimed is:

1. An information generation apparatus comprising:
one or more memories storing instructions; and
one or more processors executing the instructions to:
detect objects from an image;
determine a plurality of objects according to positions of the detected objects;
integrate the determined plurality of objects; and
generate metadata including information regarding an integrated object,
wherein, in a case where a first object and a second object are detected from the image and in a case where the first object and the second object are integrated, the metadata includes an index of the first object, an index of the second object, an index of the integrated object and position information indicating a position on the integrated object, but the metadata does not include position information indicating a position on the first object and position information indicating a position on the second object.

2. The information generation apparatus according to claim 1, wherein, in a case where the plurality of objects is determined according to distances between the objects detected from the image.

3. The information generation apparatus according to claim 1, wherein the metadata is compliant with annotated region supplemental enhancement information (ARSEI).

4. The information generation apparatus according to claim 1, wherein the one or more processors further execute the instructions to determine, based on a predetermined condition, whether to enable a grouping process for grouping the detected objects.

5. The information generation apparatus according to claim 4, wherein whether to enable the grouping process is determined based on information regarding a communication band of a network.

6. The information generation apparatus according to claim 4, wherein whether to enable the grouping process is determined based on the number of objects detected from the image.

7. The information generation apparatus according to claim 6, wherein, in a case where the number of objects detected from the image is greater than or equal to a threshold, it is determined that the grouping process is to be enabled.

8. The information generation apparatus according to claim 1, wherein, in a case where the first object and the second object are detected from the image and in a case where the first object and the second object are not determined as the plurality of objects, the metadata includes the index of the first object, the index of the second object, position information indicating a position on the first object and position information indicating a position on the second object.

9. An information generation method comprising:

detecting objects from an image;

determining a plurality of objects according to positions of the detected objects;

integrate the determined plurality of objects; and generating metadata including information regarding an integrated object, wherein, in a case where a first object and a second object are detected from the image and in a case where the first object and the second object are integrated, the metadata includes an index of the first object, an index of the second object, an index of the integrated object and position information indicating a position on the integrated object, but the metadata does not include position information indicating a position on the first object and position information indicating a position on the second object.

10. A non-transitory computer-readable storage medium storing a program for causing a computer to execute an information generation method comprising:

detecting objects from an image;

determining a plurality of objects according to positions of the detected objects;

integrate the determined plurality of objects; and generating metadata including information regarding an integrated object, wherein, in a case where a first object and a second object are detected from the image and in a case where the first object and the second object are integrated, the metadata includes an index of the first object, an index of the second object, an index of the integrated object and position information indicating a position on the integrated object but the metadata does not include position information indicating a position on the first object and position information indicating a position on the second object.

* * * * *